Jan. 1, 1957 T. C. DINGMAN ET AL 2,776,161
MOTOR VEHICLE HANDLE ASSEMBLY
Filed April 9, 1954

T. C. DINGMAN
W. GURSKI
INVENTORS

BY E. C. McRae
J. R. Faulkner
D. H. Oster

ATTORNEYS

United States Patent Office 2,776,161
Patented Jan. 1, 1957

2,776,161

MOTOR VEHICLE HANDLE ASSEMBLY

Thomas C. Dingman, Dearborn, and Walter Gurski, Detroit, Mich., assignors to Ford Motor Company, Dearborn, Mich., a corporation of Delaware Application April 9, 1954, Serial No. 422,047

3 Claims. (Cl. 292—353)

This invention relates generally to a handle assembly for motor vehicles, and has particular reference to a readily detachable handle construction.

An object of the present invention is to provide an inside handle for a motor vehicle, such as a window regulator handle or an inside remote door lock control handle, of such construction that the handle may be readily detached from the shaft or stem protruding from the inner door body panel to permit the adjacent upholstery panel to be removed and access to be had to the interior of the door or body for necessary repairs or adjustments. The handle construction incorporates a spring detent carried in a cavity formed therein and movable between two spaced positions, one of which blocks removal of the handle from the shaft and the other of which permits removal of the handle. The detent is arranged to be completely removable from the handle yet is normally resiliently held therein even when the handle is removed from its shaft so that it cannot become lost or displaced and is always in position to be readily moved into blocking position with a groove on the shaft when the handle is reassembled to the shaft. The detent is arranged to be effectively shielded from normal view yet is conveniently mounted for manipulation between its two positions.

Other objects and advantages of this invention will be made more apparent as this description proceeds, particularly when considered in connection with the accompanying drawings, wherein.

Figure 1:
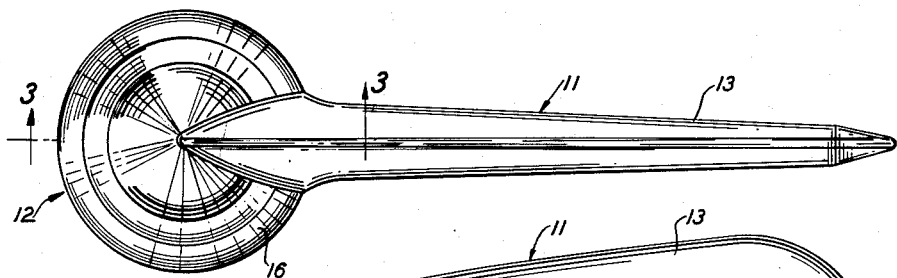
Figure 1 is a plan view of a handle assembly incorporating the present invention.
Figure 2:
Figure 2 is a side elevational view of the handle shown in Figure 1.

Referring now to the drawings, the reference character 11 indicates generally a handle for a motor vehicle having a hub portion 12 and a crank arm 13 adapted to be manually engaged for operation of the handle. In the present instance the handle shown is an inside remote control handle for a door lock mechanism, but the construction of the present invention may be used as well in connection with other types of motor vehicle interior handles such as for a window regulator mechanism.

Figure 3:
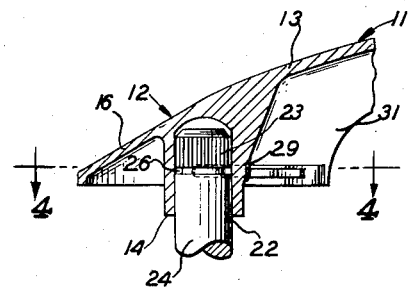
Figure 3 is a longitudinal cross sectional view through the handle taken on the line 3—3 of Figure 1.
Figure 6:
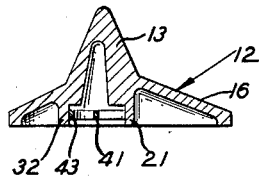
Figure 6 is a cross sectional view taken on the line 6—6 of Figure 4.
Figure 7:
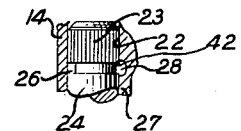
Figure 7 is a fragmentary cross sectional view taken on the plane indicated by the line 7—7 of Figure 5.

The handle is preferably formed by die casting, and the hub portion 12 thereof comprises an inner hub 14 and an outer dome shaped hub portion 16 interconnected to the inner hub 14 by a plurality of radially extending ribs 17, 18, 19, and 21. The ribs 17, 18, and 19 are arranged at right angles to each other, but the rib 21 is positioned closer to the rib 19 than the rib 17, for a purpose to be made clear hereinafter. As best seen in Figure 3, the upper portion of the dome shaped outer hub 16 is integrally connected to the upper portion of the inner hub 14.

The inner hub 14 is formed with a cylindrical bore 22, the upper portion of which is serrated to receive the serrated end portion 23 of a shaft or stem 24 to non-rotatably mount the handle 11 upon the shaft yet to permit it to be readily removed by relative axial movement therebetween. Intermediate its ends the shaft 24 is formed with an annular groove 26.

Figure 4:
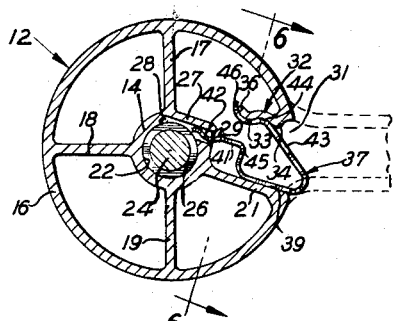
Figure 4 is a cross sectional view taken on the line 4—4 of Figure 3.
Figure 5:
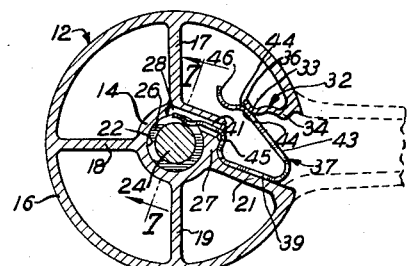
Figure 5 is a cross sectional view similar to Figure 4 but showing the spring detent in a different position.

As best seen in Figures 4 and 5, the inner hub 14 of the handle is formed with an embossment 27 provided with a cylindrical bore 28 intersecting the bore 22 formed in the inner hub 14. The axis of the bore 28 lies in a plane which is perpendicular to the axis of the bore 22, and the bore 28 is positioned so as to intersect the bore 22 adjacent the annular groove 26 formed in the shaft 24. The bore 28 has a chamfered outer edge 29 opening into the space between the radially extending ribs 17 and 21 at a point spaced radially outwardly from the axis of the bore 22.

Directly beneath the crank arm 13 of the handle, the outer periphery of the dome shaped outer hub 16 is open, as at 31, and adjacent one side of this opening an integral flange 32 is provided, extending radially inwardly toward the inner hub 14. The flange 32 is formed with a pair of arcuate projections 33 and 34 and with a terminal edge portion 36 forming a stop.

Figure 8:
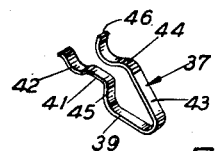
Figure 8 is a perspective view of the spring detent.

A spring clip or detent 37, generally U-shaped, is provided to detachably retain the handle 11 in assembled relationship upon the shaft 24. As best seen in Figures 4, 5, and 8, the long leg 39 of the detent is formed with an offset extension 41 and with an arcuate hump 42 adjacent its end. The short leg 43 of the spring detent 37 is divergently related to the leg 39, and is provided with an intermediate arcuately bent retaining portion 44 and with a hook shaped terminal end portion 46.

As best seen in Figures 4 and 5, the long leg 39 of the spring detent 37 is adapted to slidably engage the rib 21 of the hub portion 12 of the handle, and the offset extension 41 of the leg 39 is insertable into the small bore 28 formed in the inner hub 14. The divergent short leg 43 of the spring detent 37 extends toward the flange 32 projecting inwardly from the outer hub 16, and the arcuate retaining portion 44 is adapted to selectively engage the projections 33 and 34 to position the detent in operative and inoperative positions respectively.

In the inoperative position shown in Figure 4, the retaining portion 44 of the spring detent 37 is yieldably held in the depression between the projections 33 and 34, and in this position the humped end portion 42 of the long leg 39 of the detent is positioned in the small bore 28 of the inner hub but is out of engagement with the annular groove 26 formed in the shaft 24. Thus, with the detent in this position, the handle 11 may be attached to or detached from the shaft 24 by axial movement relative thereto. At the same time, however, it will be noted that the spring detent is still carried by the handle in position for ready manipulation, and therefore cannot become lost or displaced from the assembly when the handle is removed.

The hook shaped terminal end portion 46 of the leg 43 of the detent engages the terminal end 36 of the flange 32 and thus forms a stop preventing complete removal of the spring detent from the handle when the detent is moved from its operative position to the inoperative position shown in Figure 4. The spring detent, of course, can be completely removed, if desired, by compressing the legs of the detent sufficiently to permit the hook shaped terminal end portion 46 to pass beneath the projections 33 and 34.

To effectively lock the handle 11 to the shaft 24 it is only necessary to move the spring detent 37 inwardly toward the shaft 24 to the position shown in Figure 5. It will be noted that in this position the end portion 42 of the leg 39 of the spring detent is in engagement with the groove 26 formed in the shaft 24, and consequently prevents axial movement of the handle relative to the shaft, thus locking the two together. This position is effected simply by moving the detent 37 inwardly with the leg 39 thereof sliding along the rib 21 until the interconnecting portion 45 abuts the end wall of the embossment 27 of the inner hub 14 to limit its inward movement. In this position, it will be noted that the retaining portion 44 of the leg 43 of the spring detent has moved inwardly beyond the inner projection 33, and the inherent resiliency of the spring detent yieldably retains the detent in this position. At this time the arcuately bent portion 42 of the leg 39 of the spring detent projects into the radially inner portion of the annular groove 26 to provide a positive interengagement therebetween.

To detach the handle from the shaft, it is only necessary to exert sufficient outward force upon the spring detent 37 to flex the leg 43 thereof toward the leg 39 an amount sufficient to enable the retaining portion 44 to pass beneath the projection 33. The retaining portion 44 then engages the projection 34 while the hook shaped terminal end portion 46 engages the end 36 of the hub flange 32 to prevent complete disengagement of the spring detent from the handle. This position is shown in Figure 4.

It will be understood that the invention is not to be limited to the exact construction shown and described, but that various changes and modifications may be made without departing from the spirit and scope of the invention, as defined in the appended claims.

What is claimed is:

1. A motor vehicle interior handle assembly comprising a shaft having an annular groove formed in its periphery intermediate its ends and a longitudinally serrated portion between said annular groove and the free end of said shaft, a handle having a hub and integral crank arm extending radially therefrom, said hub having a longitudinally serrated bore non-rotatably receiving the serrated portion of said shaft and an elongated opening intersecting and opening into said bore adjacent the annular groove in said shaft, the axis of said elongated opening lying in a plane perpendicular to the axis of said bore, said handle having a pair of generally radially spaced projections formed on the interior thereof, and a generally U-shaped spring detent having a first leg adapted to be inserted into the elongated opening in said hub and a second leg having a retaining portion adapted to engage said spaced projections, the radially inner of said pair of projections being positioned to engage the retaining portion of the second leg of said spring detent when the latter has been moved to a position such that the first leg of said detent is received within the annular groove formed in the periphery of the shaft to prevent disengagement of said shaft from said handle, the radially outer of said pair of projections being positioned to engage the retaining portion of said spring detent when the latter has been withdrawn to a position such that the first leg of the detent is out of engagement with the annular groove in said shaft to permit detachment of said handle from said shaft.

2. The structure defined by claim 1 which is further characterized in that said elongated opening comprises a cylindrical bore extending tangentially to the bore in said hub and having an open end facing generally radially outwardly of said bore, said U-shaped spring detent being formed of flat spring stock having a width smaller than the diameter of said last mentioned cylindrical bore and being formed adjacent the end of its first leg with a bent portion adapted to project into the annular groove in said shaft, the second leg of said spring detent having a hook shaped terminal end portion adapted to engage a stop portion of said handle adjacent the radially inner of said pair of projections and an outwardly bent portion spaced a short distance from the terminal end portion of the leg adapted to be selectively engageable with said pair of projections to retain said spring detent resiliently attached to said handle in either of its two positions.

3. A motor vehicle interior handle assembly comprising a shaft having an annular groove formed in its periphery intermediate its ends and a longitudinally serrated portion between said annular groove and the outer end of said shaft, a handle having a hub portion formed with an inner hub and an outer dome shaped hub, said dome shaped outer hub having its peripheral portion integrally connected to said inner hub by a plurality of radially extending ribs and the central portion of said dome shaped outer hub being integrally joined to one end of said inner hub, said dome shaped outer hub having an integral arched crank arm extending radially therefrom, said inner hub having a longitudinally serrated bore nonrotatably receiving the serrated portion of said shaft, said inner hub also having an elongated cylindrical bore intersecting said first bore adjacent the annular groove formed in the periphery of said shaft with the axis of said second bore lying in a plane extending at right angles to the axis of said first bore, said second bore having an open end facing radially outwardly of said inner hub intermediate two of the radially extending ribs of the handle, the outer hub portion of said handle having a retaining flange extending radially inwardly toward said inner hub between said two adjacent ribs, said retaining flange having a pair of radially spaced arcuate projections formed thereon, and a generally U-shaped spring detent for detachably connecting said handle to said shaft, one of the legs of said detent being slidably positioned adjacent one of the two adjacent ribs of said handle and having an offset terminal end portion insertable into said second bore, and the other of the legs of said detent having an arcuately bent retaining portion adjacent its end resiliently engageable with said pair of spaced projections on said inwardly projecting flange to retain said spring detent in said handle in either of two positions, said second mentioned leg of the spring detent also having a hook shaped terminal end portion engageable with the radially inner end of said flange to prevent inadvertent disengagement of said spring detent from said handle, the terminal end portion of said first leg of the spring detent having a length such that it is positioned in said second bore out of engagement with the annular groove in said shaft when the retaining portion of the spring detent is in engagement with the outer of said pair of projections and is positioned in blocking engagement with the annular groove in said shaft when the retaining portion of said detent is in engagement with the radially inner of said pair of projections.

References Cited in the file of this patent

UNITED STATES PATENTS

| | | |
|---|---|---|
| 1,847,395 | Hickman | Mar. 1, 1932 |
| 1,877,798 | Briggs et al. | Sept. 20, 1932 |
| 1,882,625 | Jacobi | Oct. 11, 1932 |
| 1,887,655 | Marple | Nov. 15, 1932 |